(No Model.)
E. LOTINGA.
CONVERTIBLE CHILD'S CARRIAGE.
No. 474,641. Patented May 10, 1892.
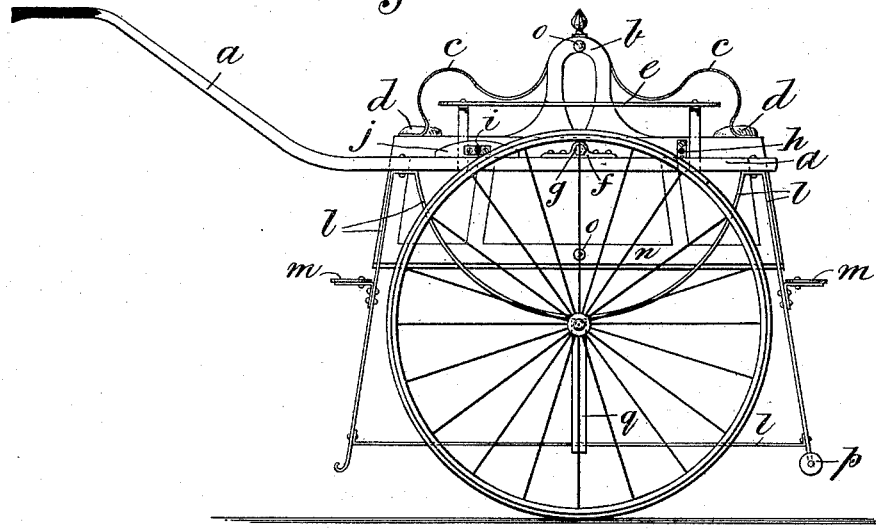
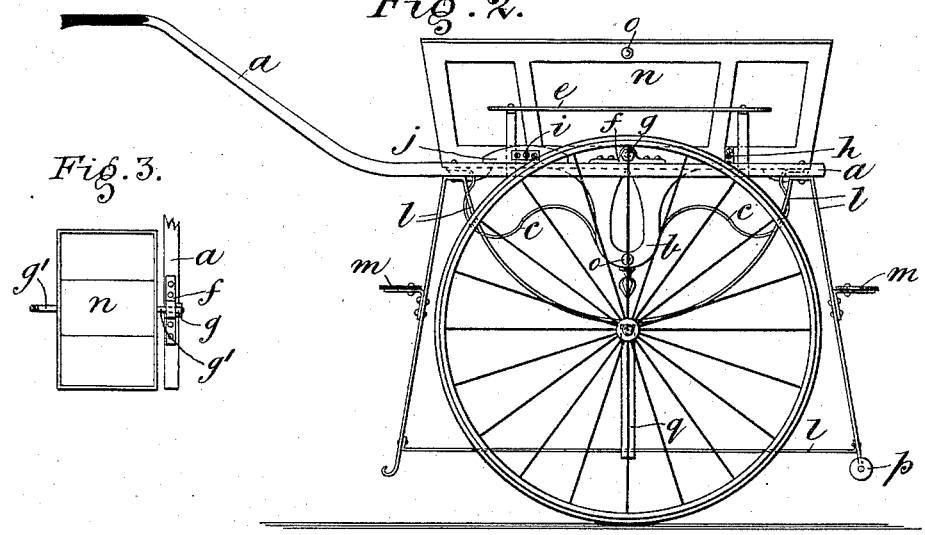
Witnesses:
Albert Knight Fox
John Edmunds
Inventor:
Eleanor Lotinga
per
John Pitt Bayly,
Attorney.

United States Patent Office.

ELEANOR LOTINGA, OF ELY, NEAR CARDIFF, ENGLAND.

CONVERTIBLE CHILD'S CARRIAGE.

SPECIFICATION forming part of Letters Patent No. 474,641, dated May 10, 1892.

Application filed February 2, 1892. Serial No. 420,047. (No model.) Patented in England August 21, 1891, No. 14,143.

*To all whom it may concern:*

Be it known that I, ELEANOR LOTINGA, a subject of the Queen of Great Britain, residing at Ely, near Cardiff, in the county of Glamorgan, England, have invented new and useful Improvements in the Construction of Go-Carts, Dog-Carts, and other Like Vehicles, whereby they are rendered convertible from one form of vehicle into another, (for which I have filed a provisional specification in Great Britain, No. 14,143, bearing date August 21, 1891,) of which the following is a specification.

My invention relates to an improved convertible carriage applicable to go-carts, dog-carts, and other like vehicles.

The object of this invention is to construct a child's bassinet with seats beneath to revolve on pivots (in the frame or other parts) attached to any light vehicle for the purpose of using the aforesaid as a child's bassinet; or to turn the said bassinet downward with the carriage-seats uppermost, when the vehicle may be used as an ordinary go-cart or any other like vehicle. I attain these objects by the mechanism illustrated in the accompanying drawings, in which—

Figure 1 is a side elevation of a double go-cart. Fig. 2 is a side elevation of the vehicle converted into a child's bassinet. Fig. 3 is a plan of the bassinet, with one of the pivots shown separate from the bearing and the other in the bearing, to a small scale. A portion of this figure is broken off for want of space.

Similar letters refer to similar parts throughout the several views.

The frame-work $l$ is constructed of light metallic material with cross-ties and long bolts to connect the same together and the whole fixed to the cranked axle $q$ and mounted on wheels. At the front and rear of the frame $l$ I fix a foot-board $m$ and at the base I provide a small wheel $p$ on each side. The frame $l$ is bolted to each of the shafts $a$, with a splash-board $e$ on each side of the vehicle. On each of the shafts $a$ I fix a bearing $f$, and in these said bearings pivot-pins $g'$ are held by nuts $g$, the said pivots $g'$ being fixed to the body of the cart $b$ for the purpose of revolving in the bearings $f$. The body is formed with two seats $d\ d$ and arm-rests $c\ c$ on the part of the body $b$ of the go-cart, as in Fig. 1.

On each of the shafts I fix a block $j$ with a female screwed socket, and in the body of the vehicle I fix four corresponding female screwed plates $h$ for the purpose of fixing the body to the block $j$ by a thumb-screw $i$ on each side of the vehicle.

In Fig. 2 the body $b$ has revolved so as to be placed downward, with the bassinet $n$ uppermost, thus being converted by withdrawing the thumb-screws $i$ in Fig. 1 and replacing the said thumb-screws $i$ in the rear female screwed plates $h$ of Fig. 1. Half-round-headed pins O are provided to button straps or covers thereto.

It will be understood that I do not bind myself to any particular shape or shapes described in the views, as the shapes of the axle or axles, frame or body, fastenings, springs, and other parts may be varied in many ways within the scope of my invention.

I am aware that go-carts, dog-carts, mail-carts, and bassinets have been made separately prior to my invention. I therefore do not claim such; but I am not aware that the convertible vehicle of my invention in the proportions stated and in the manner herein described has ever been done before.

What I claim, and desire to secure by Letters Patent of the United States, is—

1. In a go-cart or dog-cart, the combination of the seats $d$, body $b$, plates $h$, thumb-screws $i$, blocks $j$, pivots $g'$, with bearings $f$, and nuts $g$, with the shafts and frame mounted on wheels, all substantially as set forth.

2. In a bassinet, the combination of the body $n$, plates $h$, thumb-screws $i$, blocks $j$, pivots $g'$, bearings $f$, and nuts $g$, with the shafts and frame mounted on wheels, substantially as described.

3. In a convertible vehicle, the combination of the body $b$ and $n$, seats $d$, arm-rests $c$, pivot-pins $g'$, and nuts $g$ to revolve in the bearings $f$ for the purpose of rendering convertible from one form of vehicle into another, substantially as herein described, and for the purpose specified.

ELEANOR LOTINGA.

Witnesses:
 ALBERT KNIGHT FOX,
 JOHN EDMUNDS.